(12) United States Patent
Matsuda

(10) Patent No.: US 6,577,306 B2
(45) Date of Patent: *Jun. 10, 2003

(54) METHOD APPARATUS AND PRESENTATION MEDIUM FOR AVOIDING A MISMATCH STATE IN A 3-DIMENSIONAL VIRTUAL SHARED SPACE

(75) Inventor: Satoru Matsuda, Kanagawa (JP)

(73) Assignee: Sony Corporation, Toyko (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/389,801

(22) Filed: Sep. 3, 1999

(65) Prior Publication Data

US 2002/0118186 A1 Aug. 29, 2002

(30) Foreign Application Priority Data

Sep. 30, 1998 (JP) ............................................. 10-277061

(51) Int. Cl.$^7$ .............................................. G06T 15/00
(52) U.S. Cl. ....................................................... 345/419
(58) Field of Search .................................. 345/419, 425, 345/426, 619, 620, 629, 630, 631, 632

(56) References Cited

U.S. PATENT DOCUMENTS 6,057,856 A * 5/2000 Miyashita et al. .......... 345/435

* cited by examiner

Primary Examiner—Phu K. Nguyen
(74) Attorney, Agent, or Firm—Bell, Boyd & Lloyd LLC

(57) ABSTRACT

An aura is prescribed to surround an avatar which is only allowed to sense other avatars in the aura. A maximum number of other avatars in the aura which the avatar is allowed to sense is predetermined. When a new avatar enters the aura such that the number of other avatars in the aura exceeds the predetermined maximum number, the avatar is not allowed to sense the new avatar. However, if the avatar also enters another aura set for the new avatar and the new avatar is allowed to sense the avatar, the avatar is also allowed to sense the new avatar even if the number of other avatars in the aura of the avatar already exceeds the predetermined maximum number. In this manner, it is possible to avoid a mismatching state in which an avatar is not allowed to sense another avatar in spite of the fact that the other avatar is allowed to sense the avatar. Accordingly, by restricting the number of objects in a virtual reality space that an avatar is allowed to sense in accordance with the present invention as described above, the amount of transmitted information can be prevented from rising even if the number of objects in the virtual reality space increases.

87 Claims, 14 Drawing Sheets

OBJECT MANAGEMENT INFORMATION

| | |
|---|---|
| A LIST OF PARTNERS KNOWING THIS OBJECT ($L_{KNOWN}$) | ID63, ID64 |
| A LIST OF PARTNERS KNOWN BY THIS OBJECT ($L_{KNOW}$) | ID63, ID64 |
| THE NUMBER OF OBJECTS KNOWN BY THIS OBJECT (N) | 2 |
| THE MAXIMUM NUMBER OF OBJECTS THAT CAN BE KNOWN BY THIS OBJECT (M) | 2 |

FIG. 13

OBJECT MANAGEMENT INFORMATION

| A LIST OF PARTNERS KNOWING THIS OBJECT ($L_{KNOWN}$) | ID51-2, ID51-3 ID91-1 |
|---|---|
| A LIST OF PARTNERS KNOWN BY THIS OBJECT ($L_{KNOW}$) | ID51-2, ID51-3 ID91-1 |
| THE NUMBER OF OBJECTS KNOWN BY THIS OBJECT (N) | 3 |
| THE MAXIMUM NUMBER OF OBJECTS THAT CAN BE KNOWN BY THIS OBJECT (M) | 2 |
| AO | 1 |
| aura-func | 0 |

METHOD APPARATUS AND PRESENTATION MEDIUM FOR AVOIDING A MISMATCH STATE IN A 3-DIMENSIONAL VIRTUAL SHARED SPACE

RELATED APPLICATIONS

This application is related to: application entitled Method, Apparatus And Medium For Describing A Virtual Shared Space Virtual Reality Modeling Language, application entitled Method, Apparatus And Presentation Medium For Multiple Auras In A Virtual Shared Space, application entitled Information Processing Apparatus, Method and Computer Program for Virtual Reality Aura Setting, application entitled Information Processing Apparatus, Method and Computer Program for Virtual Reality Transparent Avatars, and application entitled Information Processing Apparatus, Method and Computer Program for Virtual Reality Object Management Using Auras, each of the above-referenced applications are assigned to Sony Corporation of Japan, the assignee of the present application, and each of the above-referenced applications concurrently filed herewith, disclosures of which are incorporated herein by reference.

CLAIM TO FOREIGN PRIORITY UNDER 35 USC §119

The present application claims priority to Japanese application No P10-277061 filed on Sep. 30, 1999 in Japan.

BACKGROUND OF THE INVENTION

1. Field of the Invention

The present invention relates to an information processing apparatus, an information processing method and a presentation medium. More particularly, the present invention relates to an information processing apparatus, an information processing method and a presentation medium which prevent the amount of transmitted information from excessively increasing, for example, in communication with other avatars through an avatar placed in a 3-dimensional virtual space.

2. Description of the Related Art

A conventional cyberspace service called Habitat® is known in the field of personal computer (PC) communication service such as NIFTY-Serve® and CompuServe® where a plurality of users connect their PCs to a central host computer through modems and a public telephone-line network to access the host computer in accordance with a predetermined communication protocol.

Lucas Film of the United States started the development of a Habitat in 1985. In a Habitat, a parturition of the user, which is an object representing the user, is placed in a virtual city called Populopolis which is rendered by 2-dimensional graphics, allowing the user to, among others, chat with another user. The parturition of the user is referred to as an avatar. An avatar is an incarnation of a user which is an object representing the user itself appearing in a virtual environment. The term avatar originates from an Indian myth and refers therein to the incarnation of a Hindu deity. In this context, a chat is a real-time conversation based on texts which are displayed on a screen as a result of input operations of characters via a keyboard. A more detailed description of Habitat is described in *Cyberspace*, Michael Benedikt edition, an NTT publication ISBN4-87188-265-9C0010, first edition of Mar. 20, 1994 (which is a translation of *Cyberspace: First Steps*, Michael Benedikt, ed. 1991, MIT Press Cambridge, Mass. ISBN 0-262-02327-X), pages 282 to 307. After approximately three years of operation of the Habitat by Quantum Link, a U.S. commercial network company, NIFTY-Serve started a Habitat service as Fujitsu Habitat® in February 1990.

In a conventional cyberspace system operated in a PC communication service of this type, a row of houses on a street and rooms in each of the houses in the virtual city are rendered by 2-dimensional graphics so that, in order to move an avatar inward or outward with respect to the background of a 2-dimensional graphic, the avatar is merely moved up and down over the background. That is to say, the display expression is poor for a pseudo experience of a walk or a movement in the virtual space. In addition, since the virtual space in which the avatar representing the user and another avatar are displayed is seen from the viewpoint of a third person, the perspective of a pseudo experience is also lost in this respect.

In order to eliminate the shortcomings described above, the virtual space is displayed with 3-dimensional graphics and to allow the user to walk about in the space with a high degree of freedom as seen from a viewpoint of the avatar is implemented utilizing a descriptive language of 3-dimensional graphic data called a Virtual Reality Modeling Language (VRML) as disclosed in pending U.S. application Ser. No. 08/678,340 filed Jul. 11, 1996, the disclosure of which is incorporated herein by reference. Details of the VRML are described in, for example, *Knowing VRML: Browsing and Building Cyberspace*, by Mark Pesce and translated by Kohichi Matsuda, Terunao kamachi, Shoichi Takeuchi, Yasuaki Honda, Junichi Koyomoto, Sadayuki Ishikawa, Ken Miyashita and Kazuhiro Hara, first edition of Mar. 25, 1996, Prentice Hall publication ISBN4-931356-37-0 (which is a translation of *VRML: Browsing & Building Cyberspace*, by Mark Pesce, 1995 New Readers Publishing ISBN 1-56205-498-8), and in *Recent Trends in VRML and CyberPassage*, by Kohichi Matsuda and Yasuaki Honda, bit (Kyoritsu publication)/1996, Vol. 28, No. 7, pages 29 to 36, No. 8, pages 57 to 65, No. 9, pages 29 to 36 and No. 10, pages 49 to 58.

In addition, the specifications of Version 2.0 of the Virtual Reality Modeling Language (ISO/IEC CD 14772) is available at the following URL: http://www.vrml.org/Specifications/VRML2.0/FINAL/spec/index.html. A Japanese version of the specifications is available at the following URL: http://www.webcity.co.jp/info/andoh/VRML/vrml2.0/spec-jp/index.html.

VRML2.0 which is the most recent version of the VRML can be used to describe and express an autonomous behavior of an object in a 3-dimensional virtual space. Thus, for example, with respect to an object walking about in a virtual space displayed by 3-dimensional graphics in a browser for VRML2.0 (i.e., a 3-dimensional virtual space) as seen from the viewpoint of the avatar, the user can obtain the perception as if the user is actually walking about in the 3-dimensional space.

Community Place® Browser/Bureau is a typical browser for VRML2.0 and software for a shared server developed as a product by Sony Corporation, the assignee of the present invention. Its prototype β version is available at the following URL: http://vs.sony.co.jp.

In a system representing such a 3-dimensional virtual system, it is reasonable to assume that the users located worldwide are capable of sharing the same 3-dimensional virtual system typically through the Internet. In this case, the number of avatars participating in the 3-dimensional virtual space (the world) increases, raising the number of messages exchanged among the objects. With a very large number of participating avatars for a given 3-dimensional virtual space, it becomes difficult to exchange messages at a high speed.

To address this problem, an area referred to as an aura is defined and prescribed (or assigned) for each object and only objects placed in the same aura share information. This approach is proposed in, for example, *A Spatial Model of Interaction in Large Virtual Environments*, by S. Benford and L. Fahlen in September 1993, in proceedings of G. DeMichelis et al. (Eds.) presented to Third European Conference on Computer Supported Cooperative Work, pages 109 to 124, in *Virtual Society: Extending the WWW to Support a Multi-user Interactive Shared 3D Environment*, by Yasuaki Honda et al. in 1995, Proceedings of VRML '95, pages 109 to 116, ACM press.

Even with this approach proposed above, the amount of transmitted information can be limited to a certain degree. Indeed, with the increasing number of participating avatars for a given 3-dimensional virtual space, the increased number of messages resulting in communication congestion may become more severe.

To further address this problem described above, it may be possible to control the size of an aura in accordance with the degree of congestion. However, with this approach, the size of the aura becomes very extremely small in the event of congestion, making it difficult for the avatar to communicate with another object.

SUMMARY OF THE INVENTION

In view of the foregoing, in accordance with one embodiment of the present invention, there is provided an information processing apparatus for receiving information through an object placed in a 3-dimensional virtual space from another object, the information processing apparatus comprising: a prescription means for prescribing a range surrounding the object and including the other object from which information is received; a setting means for setting a restrictive item restricting reception of information from the other object placed in the range prescribed by the prescription means; and a control means for controlling reception of information from the other object in accordance with the range prescribed by the prescription means and the restrictive item set by the setting means.

According to another aspect of the present invention, there is provided an information processing method for receiving information through an object placed in a 3-dimensional virtual space from another object, the information processing method comprising the steps of: a prescription step of prescribing a range surrounding the object and including the other object from which information is received; a setting step of setting a restrictive item restricting reception of information from the other object placed in the range prescribed at the prescription step; and a control step of controlling reception of information from the other object in accordance with the range prescribed at the prescription step and the restrictive item set at the setting step.

According to a further aspect of the present invention, there is provided a presentation medium for presenting a program executable by a computer to drive an information processing apparatus for receiving information through an object placed in a 3-dimensional virtual space from another object to carry out processing including: a prescription step of prescribing a range surrounding the object and including the other object from which information is received; a setting step of setting a restrictive item restricting reception of information from the other object placed in the range prescribed at the prescription step; and a control step of controlling reception of information from the other object in accordance with the range prescribed at the prescription step and the restrictive item set at the setting step.

Since reception of information from another object is controlled in accordance with a range and a restrictive item which are set in advance, the amount of transmitted information can be restricted even if the number of objects in the virtual reality space increases. Accordingly, the present invention allows information to be exchanged with other objects with a high degree of reliability even if the number of objects in a 3-dimensional virtual space increases.

These and other features and advantages of the present invention will be understood upon consideration of the following detailed description of the invention and the accompanying drawings.

BRIEF DESCRIPTION OF THE DRAWINGS

FIG. 13 is an explanatory diagram used for describing other control information of objects owned by the shared server employed in the system shown in FIG. 1.

DETAILED DESCRIPTION OF THE PREFERRED EMBODIMENTS

Figure 1:
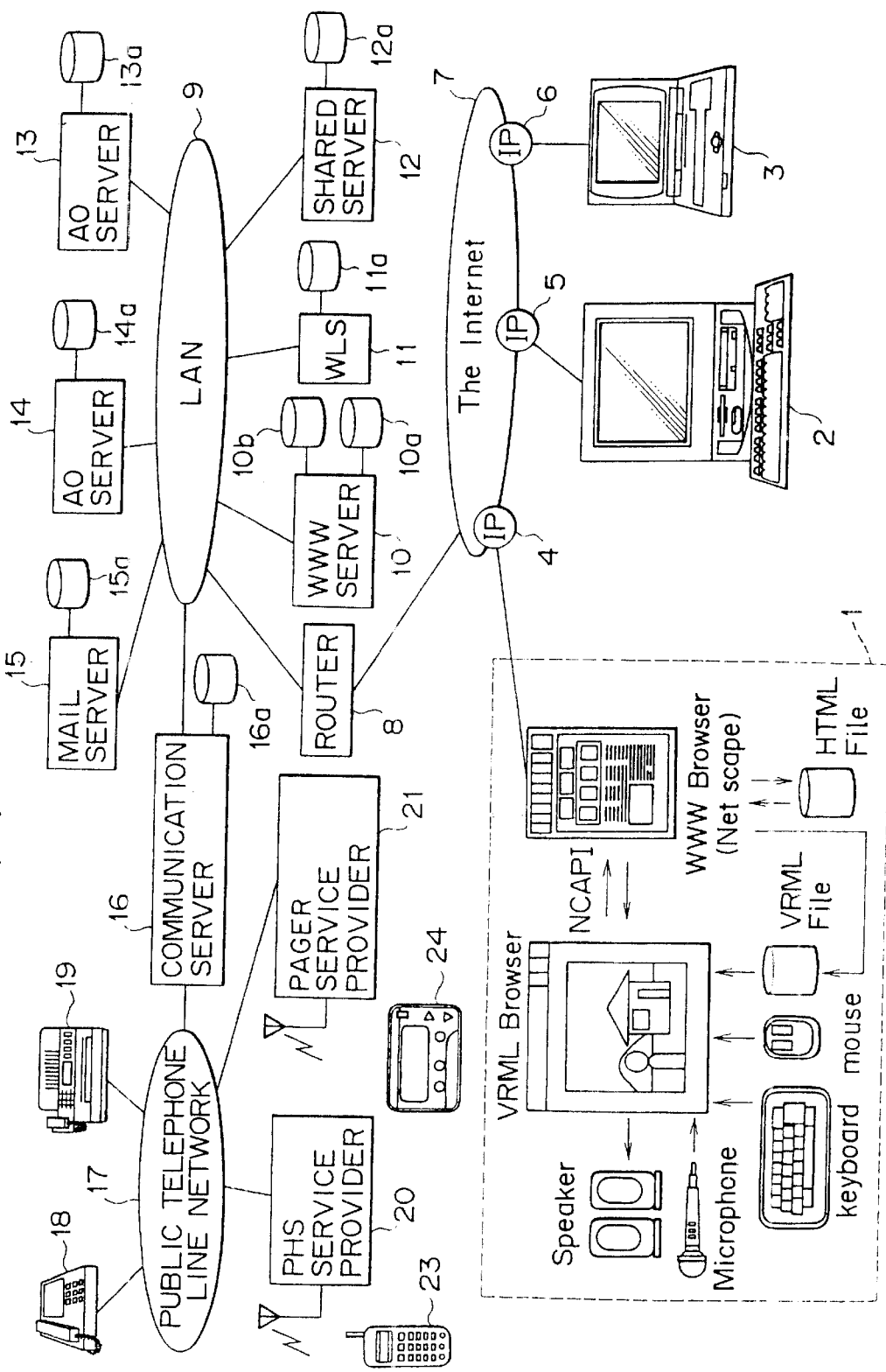
FIG. 1 is a block diagram showing a typical configuration of a system presenting a shared virtual space to which the present invention is applied.

FIG. 1 is a block diagram showing a typical configuration of a shared virtual space system to which the present invention is applied. It should be noted that the virtual shared space system described in the present application is intended to include a system obtained as a result of logically and operatively configuring a plurality of devices regardless of whether the devices are physically accommodated in one physical embodiment.

As shown in FIG. 1, client PCs 1 to 3 are connected to the Internet 7 through Internet connection service providers (IPs) 4 to 6 respectively. In each of the client PCs 1 to 3, a VRML browser and a web browser are installed for operation therein.

The client PCs 1 to 3 each have two functions, namely, a 3-D client function and a 2-D client function. The 3-D client function is used to notify a shared server 12 periodically or as need arises, for example, when data such as information on the location of the client PC is necessary, and to receive information shared by other 3-D objects from shared server 12. On the other hand, the 2-D client function is executed to transmit a request for information to a web server 10 in accordance with an HTTP, to receive a response to the request from web server 10, and to primarily display 2-dimensional information. When a URL is included in the information received from shared server 12, the 3-D client function issues a request for access to the URL to the 2-D client function. Upon this request, the 2-D client function accesses the URL (in actuality, to web server 10) to download data such as the shape of an object and to pass on the data to the 3-D client function.

A Local Area Network (LAN) 9 is connected to the Internet 7 through a router 8. Connected to LAN 9 are web server 10, a World Location Server (WLS) 11, shared server 12, Application Object (AO) servers 13 and 14, a mail server 15, and a communication server 16. Web server 10 includes hard discs (HDDs) 10a and 10b, whereas the other servers 11 to 16 include HDDs 11a to 16a, respectively.

It should be noted that AO server 13 has loaded therein a computer program for communicating with the shared server 12 to present, for example, an application object (AO) such as a robot or an electronic pet which moves autonomously in a virtual space. Much like the 3-D client function, AO server 13 communicates with shared server 12 to report information on itself and to receive information shared by other 3-D objects.

The communication server 16 is connected to a telephone 18 or a facsimile 19 through a public telephone switching network 17, connected wireless to a Personal Handyphone System (PHS) terminal 23 through a PHS service provider 20, and to a pager terminal 24 through a pager service provider 21.

Figure 2:
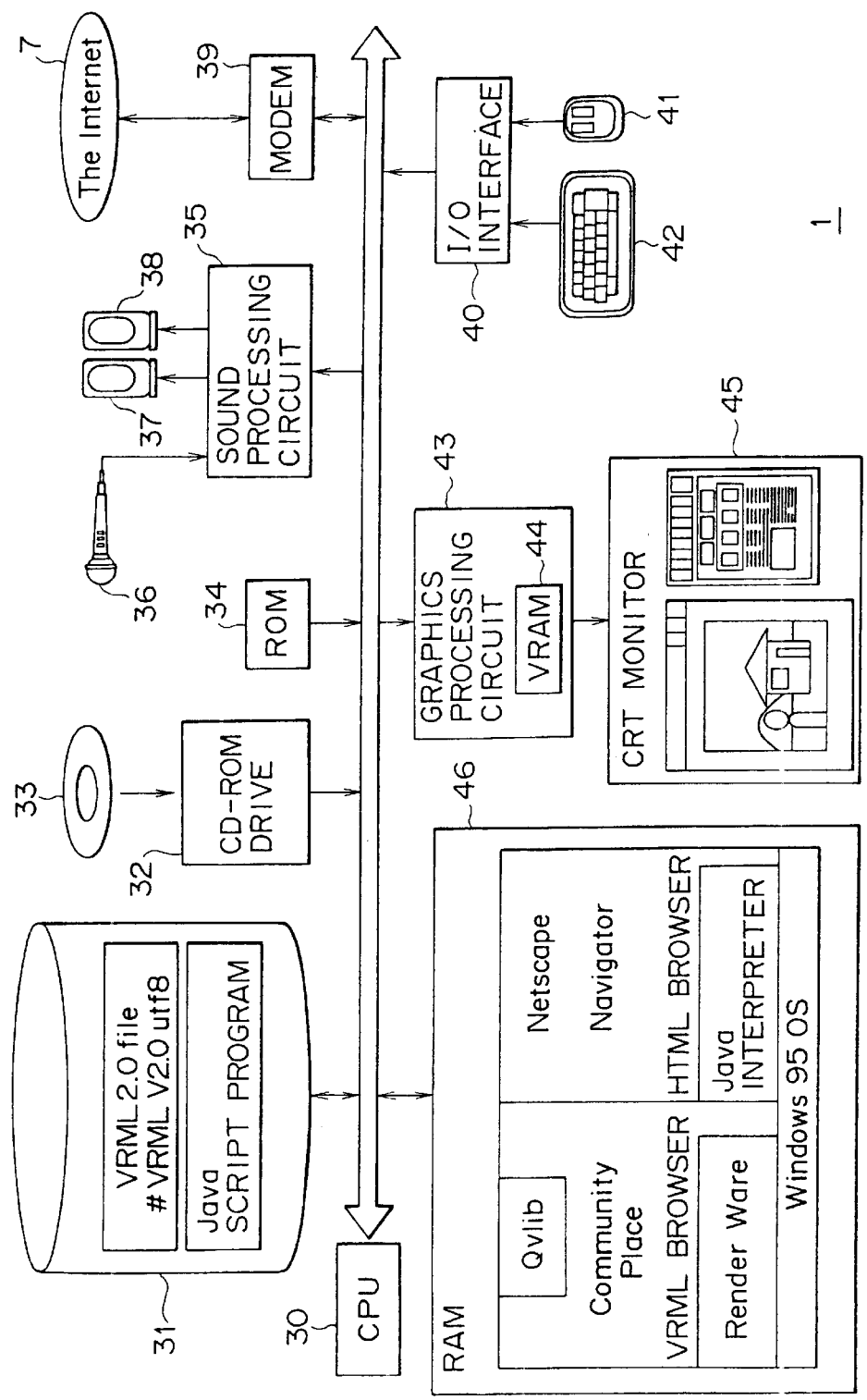
FIG. 2 is a block diagram showing a typical configuration of a client PC employed in the system shown in FIG. 1.

FIG. 2 is a block diagram showing a typical configuration of the hardware of client PC 1. In this configuration, a CPU 30 performs various kinds of processing by executing a computer program stored in a ROM unit 34. A HDD 31 is used for storing, among others, VRML contents such as VRML2.0 files and predetermined script programs written in Java® language developed by Sun Microsystems, Inc. A CD-ROM drive 32 reads out VRML contents stored in a CD-ROM disc 33.

A sound processing circuit 35 is connected to a microphone 36 and right and left speakers 37 and 38 to receive sound inputs from microphone 36 and to output sounds such as music and operation messages to the speakers 37 and 38. A modem 39 connected to Internet 7 is used for exchanging data with the Internet 7. An input/output (I/O) interface 40 receives operation signals from input devices such as a mouse 41 and a keyboard 42. A graphics circuit 43 includes an embedded VRAM 44 for storing picture data completing various kinds of processing. The graphics circuit 43 reads out picture data from VRAM 44 and outputs the data to a CRT monitor 45 for display to the user.

A Netscape Navigator®, a Java interpreter and the Community Place Browser are loaded into a RAM 46 to be executed by CPU 30. The Netscape Navigator is a web browser which runs under Window 95® environment, and the Community Place Browser is a VRML2.0 browser developed by Sony Corporation, the assignee of the present application.

The VRML2.0 browser implements QvLib (which is a library for interpreting the VRML syntax or a purser developed and opened to the public by Silicon Graphics, and RenderWare, a software renderer developed by Criterion Software Ltd., or a purser and a renderer having capabilities equivalent to those of QvLib and RenderWare, respectively.

As shown in FIG. 1, the Community Place Browser exchanges various kinds of data with the Netscape Navigator serving as a web browser in accordance with a Netscape Client Application Programming Interface® (NCAPI).

The Netscape Navigator® receives an HTML file and VRML contents (including a VRML file and a script program written in Java language) transmitted by web server 10 by way of Internet 7, storing the HTML file and the VRML contents in local HDD 31. The Netscape Navigator® processes the HTML file and displays on a CRT monitor 45 text and pictures obtained as a result of the processing. On the other hand, the Community Place Browser processes the VRML file to display a 3-dimensional virtual space on CRT monitor 45 and changes behaviors of objects in the 3-dimensional virtual space and other display states such as prescribing or assigning auras of predetermined sizes and ranges for various avatars in accordance with a result of execution of the script program by the Java interpreter.

It should be noted that the other client PCs 2 and 3 each have the same configuration as the client PC 1 even though the configurations of the PCs 2 and 3 are not shown explicitly in the figure.

Figure 3:
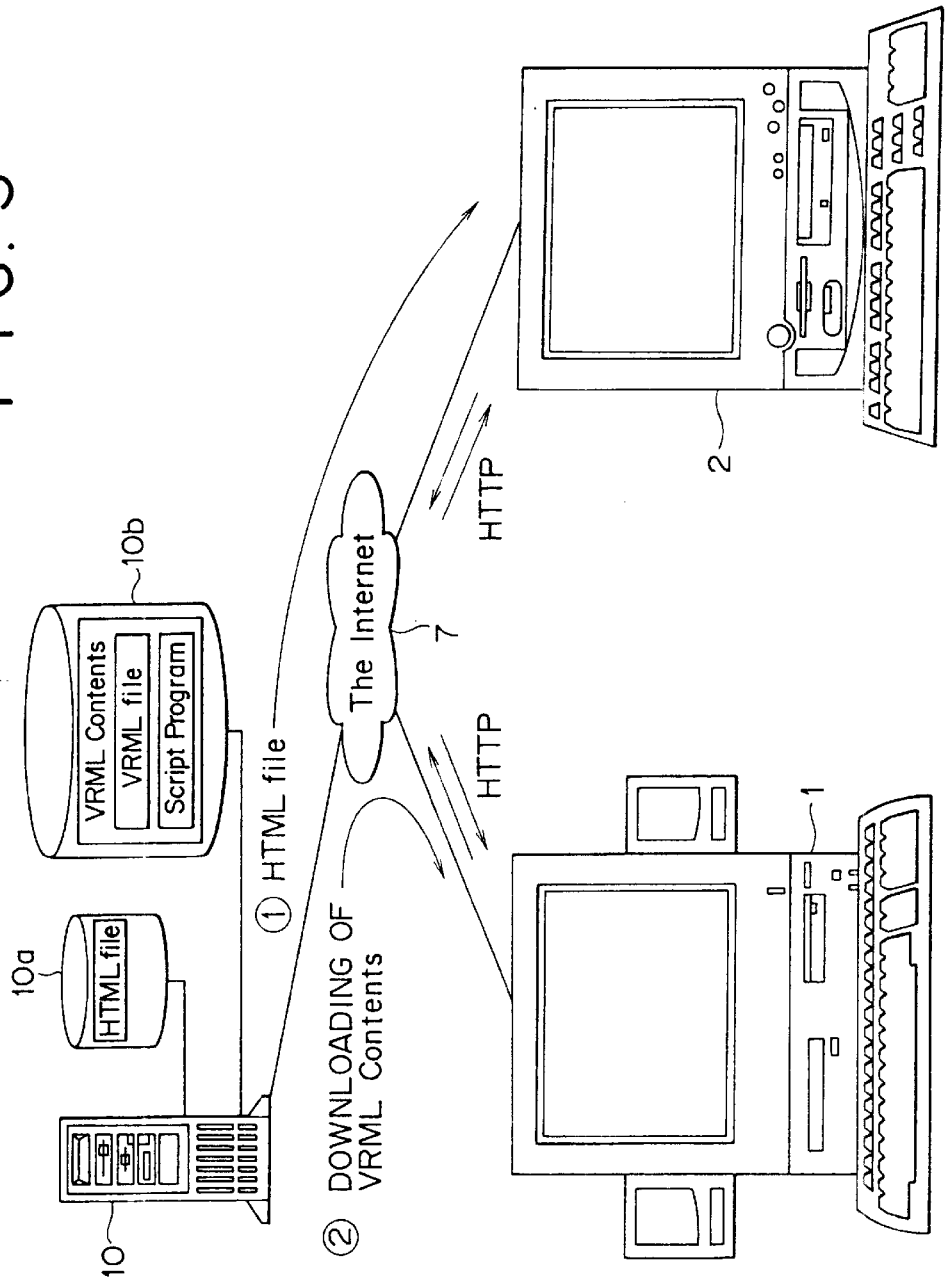
FIG. 3 is an explanatory diagram used for describing the operation of the system shown in FIG. 1.

Next, the operation of the embodiment described above is explained by referring to FIGS. 3–5. In the state shown in FIG. 3, a home page of a web site providing VRML contents is viewed using the web browser as shown by reference number 1. In this example, the home page is accessed at the following URL: http://pc.sony.co.jp/sapari/. Then, the user of the client PC 1 or 2 downloads VRML contents comprising a VRML2.0 file and a script program written in Java language to express autonomous motions in a VRML space as shown by reference number 2. Needless to say, VRML contents can also be obtained by having CD-ROM drive 32 read out the contents from CD-ROM disc 33.

Figure 4:
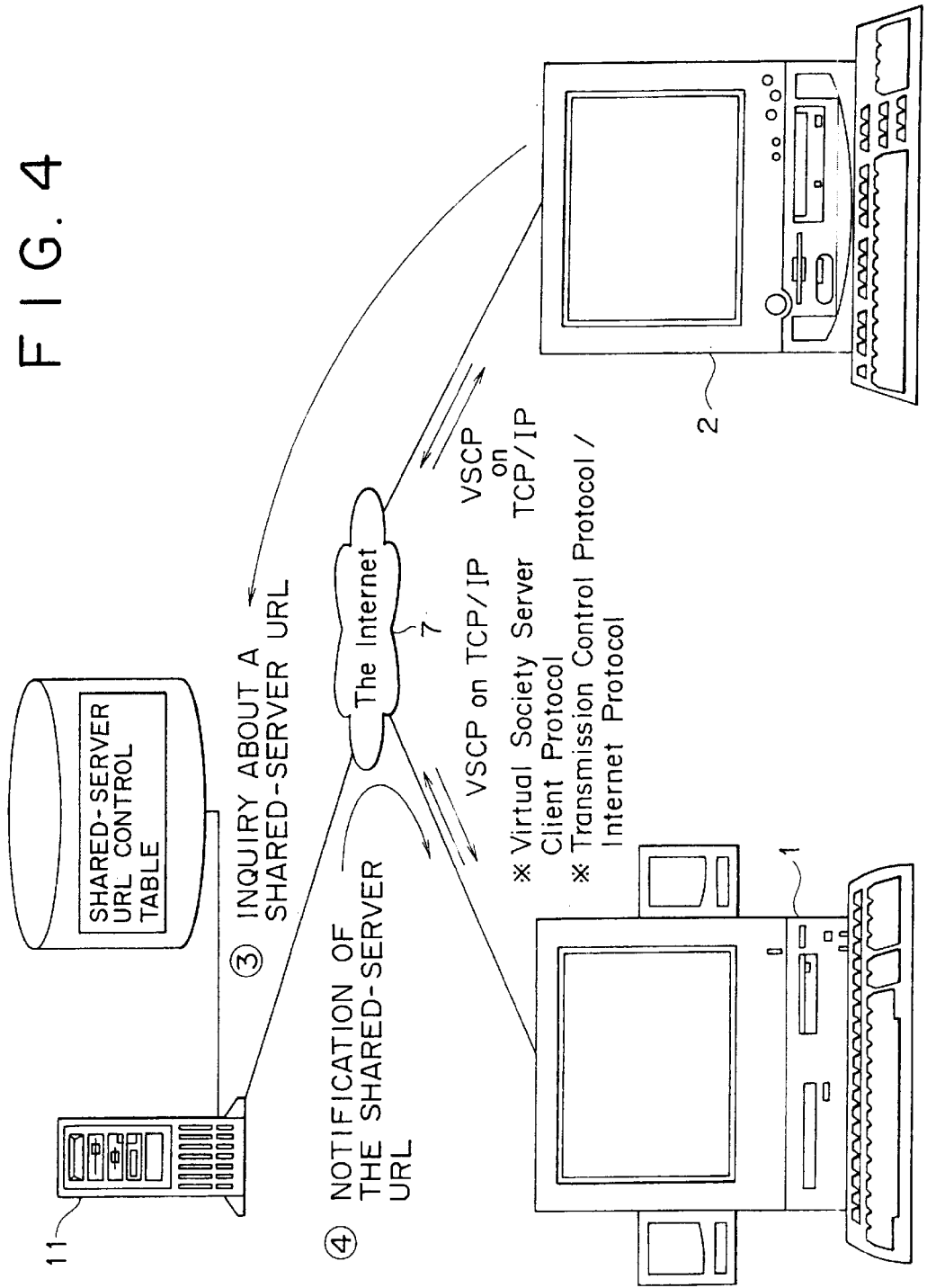
FIG. 4 is an explanatory diagram used for describing the operation of the system shown in FIG. 1.

Thereafter, the Community Place Browser serving as a VRML2.0 browser in client PC 1 or 2 interprets and executes the VRML2.0 file downloaded and temporarily stored in local HDD 31 as shown in FIG. 4 and, as indicated by reference number 3, an inquiry regarding the URL of shared server 12 is transmitted to WLS 11 in accordance with a Virtual Society Server Client Protocol (VSCP). Receiving the inquiry, as indicated by reference number 4, WLS 11 searches a shared server URL control table stored in HDD 11a for the URL of shared server 12 and transmits the URL to client PC 1 or 2 in response to the inquiry.

Figure 5:
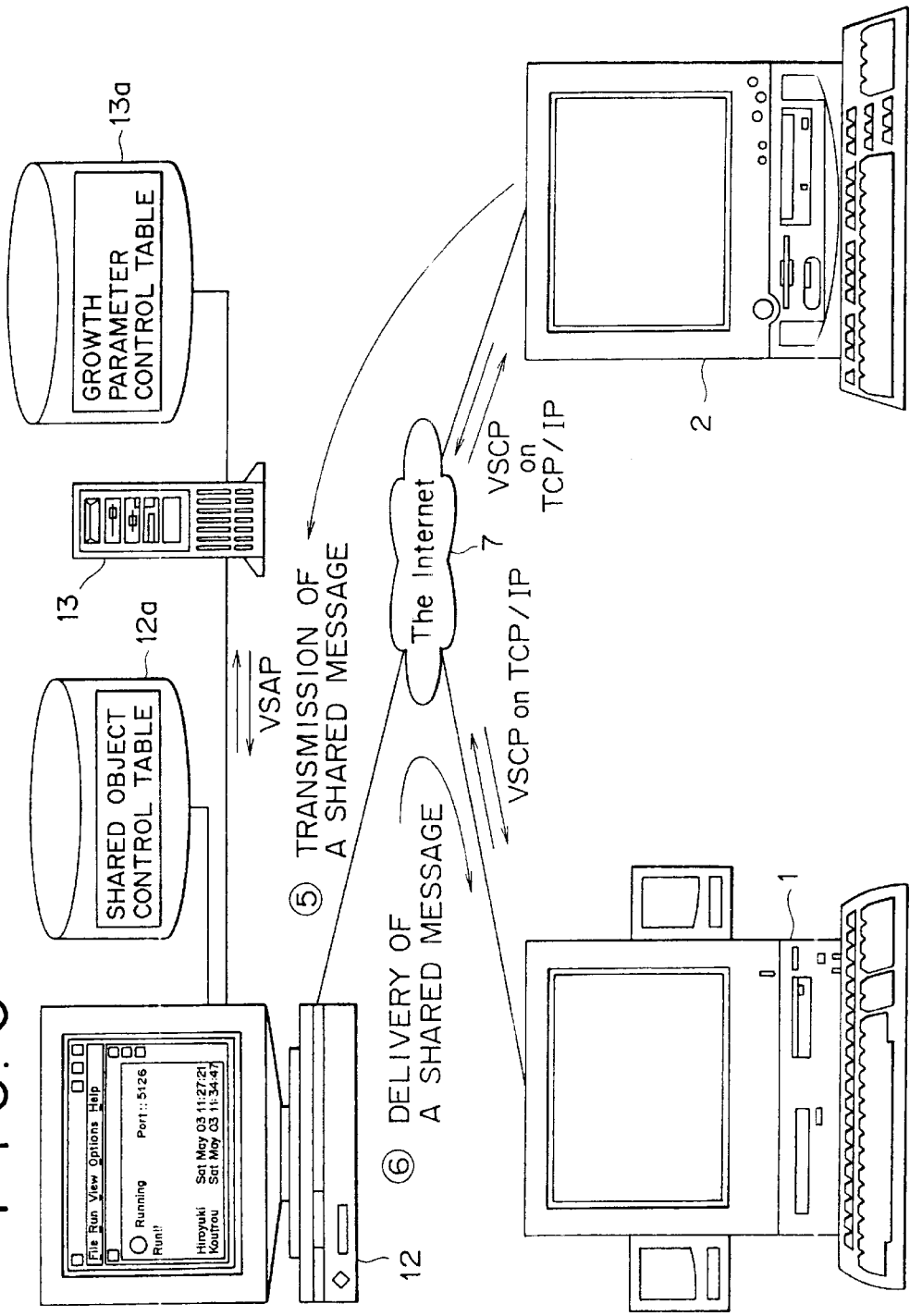
FIG. 5 is an explanatory diagram used for describing the operation of the system shown in FIG. 1.

As shown in FIG. 5, the URL is used to connect client PC 1 and 2 to shared server 12. As a result, a shared message on attributes of a shared 3-D object such as the position and the motion thereof is transmitted by way of shared server 12 as indicated by reference number 5, and the shared message is delivered as indicated by reference number 6. In this manner, a multi-user environment is implemented. A detailed description of the connection procedure described above is disclosed in U.S. patent application Ser. No. 08/678,340.

While the 3-dimensional virtual space is used in a multi-user environment in this example, the 3-dimensional virtual space may also be used in an environment other than a multi-user environment. That is, the 3-dimensional virtual space may be used in an environment which is referred to hereafter as a single-user environment for the sake of convenience. In a single-user environment, the avatar of another user is not permitted to appear in the 3-dimensional virtual space, and the avatar of this particular user is not permitted appear in the 3-dimensional virtual space of the client PC of the user other than that in the particular user initiating the various processes indicated by reference numbers 1 and 2. For convenience, the avatar of another user and the avatar of the particular user are referred to as a drawn avatar and a pilot avatar, respectively. In order to establish a single-user environment, it is not necessary to carry out the various processes indicated by reference numbers 3 to 6.

Figure 6:
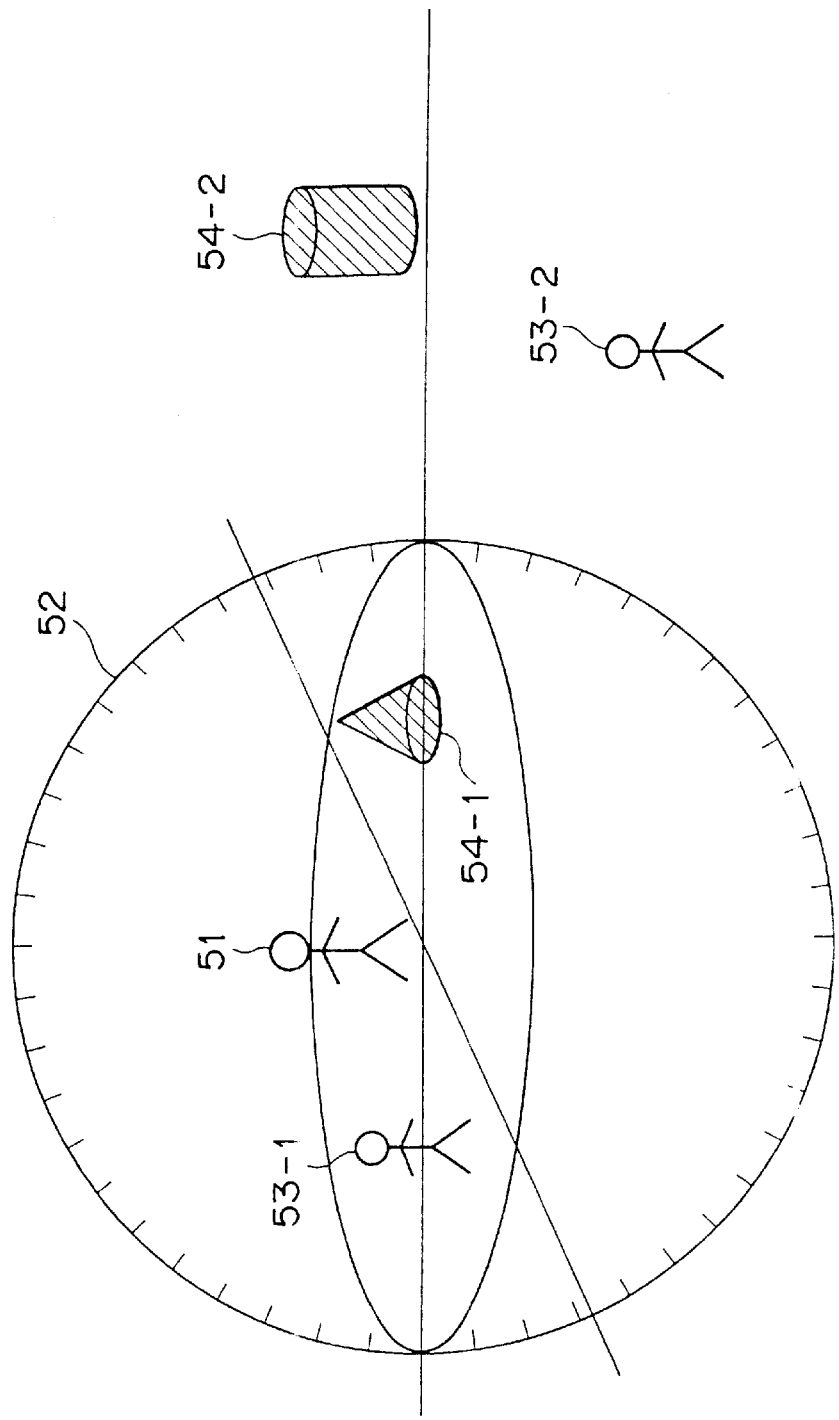
FIG. 6 is an explanatory diagram used for describing an aura.

Next, an aura is explained with reference to FIG. 6. As shown in the figure, an aura 52 with a spherical shape having a predetermined radius is formed around a pilot avatar 51 with the center of the sphere coinciding with pilot avatar 51. The pilot avatar 51 is capable of receiving information from another object located inside the aura 52. That is, pilot avatar 51 is capable of visually recognizing a drawn avatar 53-1 and an application object AO 54-1 which are located inside aura 52. In other words, the pictures of drawn avatar 53-1 and object AO 54-1 are displayed on the CRT monitor of the client PC of pilot avatar 51. However, pilot avatar 51 is not capable of visually recognizing neither a drawn avatar 53-2 nor an application object AO 54-2 which are located outside aura 52. Thus, the pictures of drawn avatar 53-2 and object AO 54-2 are not displayed on the CRT monitor of the client PC of pilot avatar 51.

By the same token, an aura is also set for each of the other objects, namely, drawn avatar 53-1 and object 54-1, drawn avatar 53-2, and object 54-2. In this embodiment, the size of each aura is uniform for all client PCs. It should be noted, however, that the aura of an AO can be set to a size different from the aura of the avatar as desired.

With the aura 52 prescribed as described above, it is necessary for pilot avatar 51 to acquire information from drawn avatar 53-1 and object 54-1, but not from drawn avatar 53-2 and object 54-2 which are located outside aura 52. Accordingly, the amount of information to be received can thus be reduced.

Figure 7:
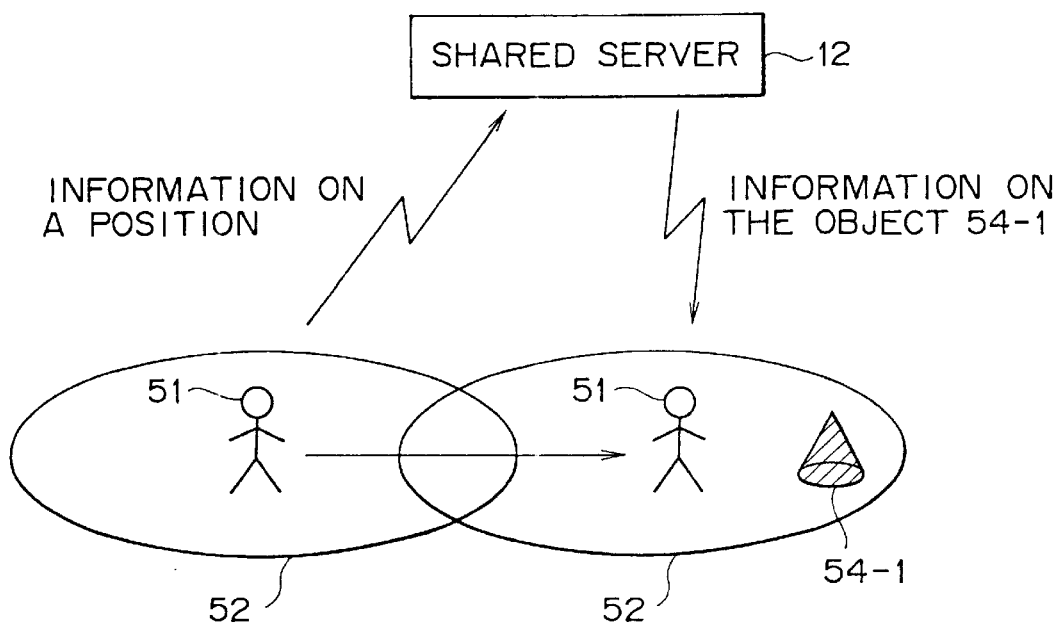
FIG. 7 is an explanatory diagram used for describing sensing of an object accompanying a movement of an avatar.

Consider an example shown in FIG. 7. When avatar 51 moves, information on its new position is transmitted to shared server 12. Receiving the information on the new position, shared server 12 identifies what objects (including avatars) are located inside aura 52 centered at the new position of avatar 51, and transmits information on the objects to the client PC of avatar 51. In this example shown in FIG. 7, since an object 54-1 is identified as an object located inside aura 52 centered at the new position of avatar 51 after the motion, shared server 12 transmits information on object 54-1 to the client PC of avatar 51. Receiving the information on object 54-1, the client PC of avatar 51 displays the picture of object 54-1, allowing the user of avatar 51 to visually recognize object 54-1.

If a large number of objects exist in the world (the virtual space), however, there may also be many objects located inside the 52, increasing the amount of information to be received. In order to prevent the amount of information to be received from exceeding a predetermined limit, a maximum number of objects in an aura that can be visually recognized by the avatar of the aura is set in advance to be controlled by shared server 12. As a result, only information on a number of objects not exceeding the maximum is transmitted. For example, assuming that the maximum number of objects in aura 52 that can be visually recognized by avatar 51 is set at "2", and there are three or more objects located inside aura 52, only two objects that are included first or temporally early are taken into account. That is, information on the third and subsequent objects included after the second one is not reported to avatar 51. The maximum number of objects in aura 52 that can be visually recognized by avatar 51 is set in advance at a value predetermined by a limit on resources in the client PC for avatar 51, a limit on a transmission band of a network between the client PC, and shared server 12 and so forth.

It should be noted, however, that the maximum number of objects in aura 52 that can be visually recognized by avatar 51 is a number of objects excluding application objects (AOs) moving autonomously in the world. Thus, avatar 51 is always capable of visually recognizing such AOs even if the number of objects included in aura 52 has already reached the maximum.

Figure 8:
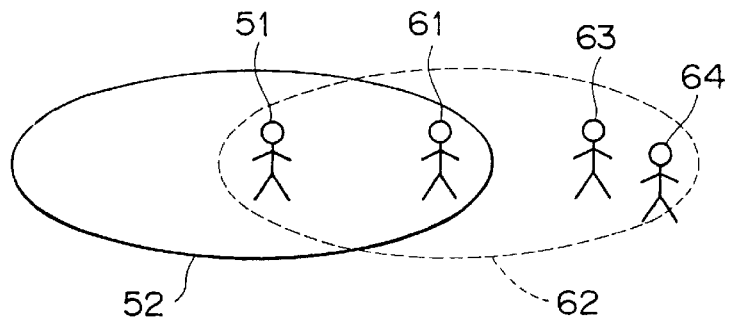
FIG. 8 is an explanatory diagram used for describing mismatching sensations of avatars.

If a maximum limit is imposed on the number of objects in an aura that can be visually recognized by the avatar of the aura as described above, it may be possible that imposition of such a limit results in a state of mismatching, that is, a state in which the avatar of the aura is not capable of visually recognizing another avatar in spite of the fact that the other avatar is capable of visually recognizing the avatar of the aura. Such state of mismatching referred to above is exemplified by the following case. When an avatar 51 enters an aura 62 of an avatar 61 after avatars 63 and 64 have already been included in aura 62 as shown in FIG. 8, avatar 51 visually recognizes avatar 61 due to the fact that avatar 61 is the only avatar other than avatar 51 in an aura 52 of avatar 51. On the other hand, avatar 61 is not capable of visually recognizing avatar 51 due to the fact that, when avatar 51 enters aura 62, the maximum number of avatars that can be recognized by aura 61 in aura 62 has already been reached by the existence of the two other avatars 63 and 64 in aura 62. Thus, when the third avatar 51 thereafter enters aura 62, the avatar count exceeds the maximum number "2", making avatar 61 incapable of visually recognizing avatar 51. As a result, avatar 61 is not capable of visually recognizing avatar 51 in spite of the fact that avatar 51 is capable of visually recognizing avatar 61. Thus, for example, avatar 51 is capable of requesting avatar 61 to have a chat with avatar 61 but avatar 61 is not capable of accepting the request made by avatar 51.

In order to avoid such a state of mismatching, the system in accordance with one embodiment of the present invention is configured such that, for example, if avatar 51 is capable of visually recognizing avatar 61, avatar 61 is also made capable of visually recognizing the newly entering avatar 51 even in a state where the presence of avatar 51 causes the avatar count in aura 62 to exceed the predetermined maximum value. It is thus possible to avoid a state of mismatching in which a specific avatar in an aura is not capable of visually recognizing another avatar in the aura in spite of the fact that the other avatar is capable of visually recognizing the specific avatar.

Figures 9, 10:
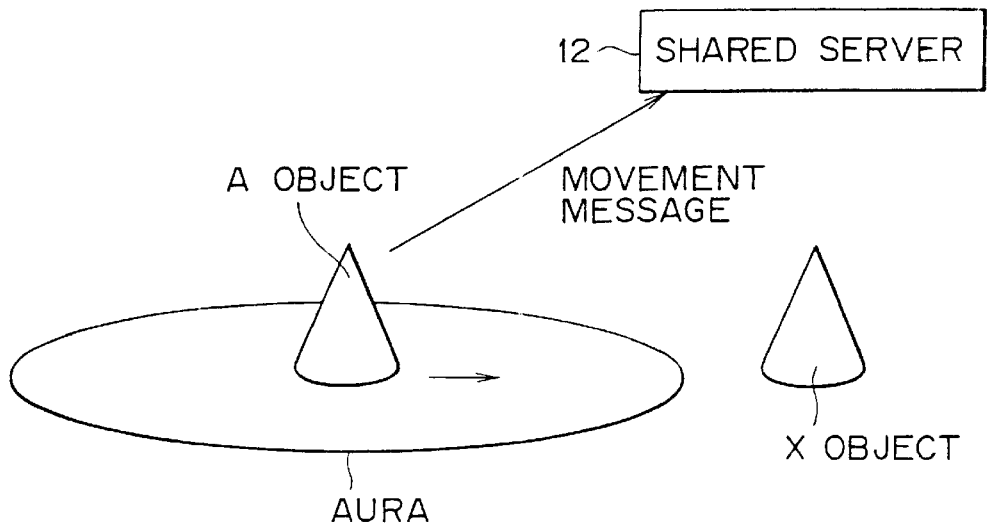
FIG. 9 is an explanatory diagram used for describing sensing of a new object accompanying a movement of an object.
FIG. 10 is an explanatory diagram used for describing control information of objects owned by a shared server employed in the system shown in FIG. 1.

The following description further explains a configuration for preventing such mismatching. When an object A having an aura covering a predetermined range moves and transmits a movement message to the shared server 12 as shown in FIG. 9, the shared server 12 determines whether a new object is to be included in the aura. For make such determination, shared server 12 controls information such as the one shown in FIG. 10 for each object.

FIG. 10 is an explanatory diagram showing an example of control information of an object A. First information Lknown is a list of objects recognized by object A. In the case of an object A representing avatar 61 as shown in FIG. 8, for example, the list Lknown includes ID63 and ID64 which are IDs for identifying avatars 63 and 64, respectively, such that avatar 61 is recognized by avatars 63 and 64. As can be seen from FIG. 10, avatar 61 in this state is not recognized by avatar 51.

The second information Lknow is a list of objects which the object A itself recognizes. For example, in the case of an object A representing avatar 61 as shown in FIG. 8, for example, the list Lknow includes ID63 and ID64 which are IDs for identifying avatars 63 and 64, respectively, such that avatar 61 located in aura 62 recognizes the avatars 63 and 64. Moreover, the third information N is the number of objects which the object A recognizes. That is, N is the number of object IDs on the list Lknow. In this example, N is set at "2". finally, the fourth information M is the maximum number of objects which are located in aura 62 and which the object A is allowed to sense. In this example, M is set at "2". That is, the object A is allowed to recognize up to two objects in aura 62.

Figure 11:
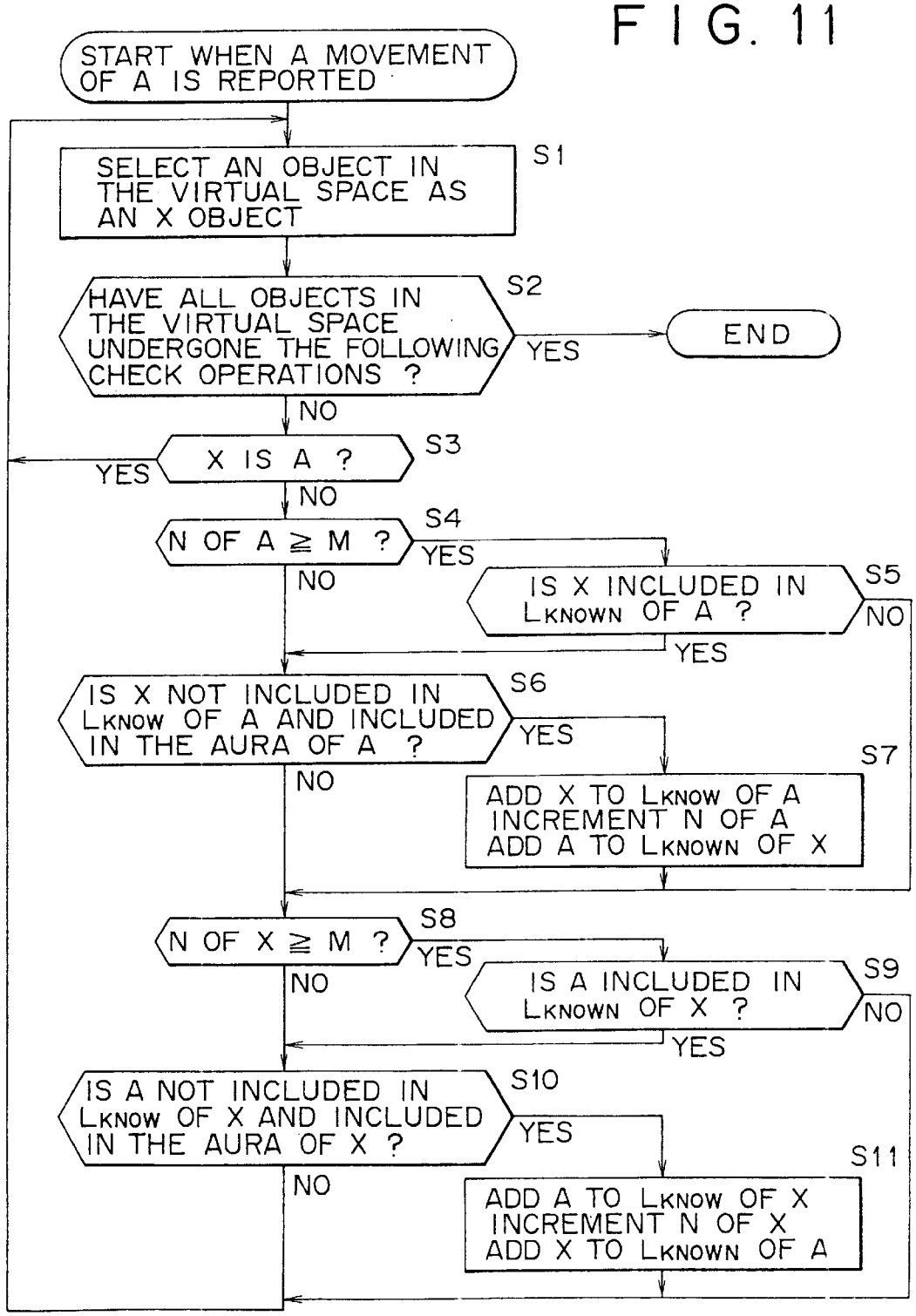
FIG. 11 shows a flowchart representing processing carried out by the shared server employed in the system shown in FIG. 1.

The following describes processing which is carried out by the shared server 12 when the shared server 12 is notified that the object A has moved to a new location with reference to the flowchart shown in FIG. 11. As shown in the figure, at step S1, shared server 12 selects an object among those existing in the 3-dimensional virtual space (the world). The selected object is referred to hereafter as an object X. Then, at step S2, shared server 12 determines whether all the objects existing in the virtual space have been subjected to the check operations at the subsequent steps. If all the objects existing in the virtual space have been subjected to the subsequent check operations, the processing is terminated. On the other hand, if any object existing in the virtual space has not been subjected to the subsequent check operations, the flow of the processing goes on to step S3.

At step S3, shared server 12 determines whether the object X selected at step S1 is an object A, that is, whether object X is an object representing the user. If the selected object X is an object representing the user, the flow of the processing returns to step S1 to repeat the various processes of steps S1 to S3. On the other hand, if the outcome of the determination at step S3 indicates that object X selected at step S1 is not an object representing the user, the flow of the processing proceeds to step S4 where shared server 12 determines whether N is at least equal to M, where N is the number of objects that can be recognized by object A, and further, where M is the maximum number of objects which object A is allowed to sense or recognize.

If N, which is also the number of objects on the list Lknow that object A has already recognized as described above, is found to be smaller than M, the flow of the processing continues to step S6 where shared server 12 determines whether the ID of object X is included in the list Lknow of object A, and whether object X is located in the aura of object A. If the ID of object X is not included in the list Lknow of object A, such that object A is not aware of object X, but object X is located in the aura of object A, the flow of the processing continues to step S7 where the ID of object X is added to the list Lknow of object A. In this manner, since object A becomes aware of object X, N representing the number of objects known by object A is incremented by 1. In addition, the ID of object A is added to the list Lknown of object X to indicate that object X is known by object A. As a result, that object A knows object X is cataloged in the list Lknow of object A, and that object X is known by object A is cataloged in the list Lknown of object X.

If the outcome of the determination at step S6 indicates that the ID of object X is included in the list Lknow of object A, that is, if object A is already aware of object X, or if object X is not located in the aura of object A, such that it is not necessary for object A to recognize object X, the flow of the processing continues to step S8, bypassing the processing of step S7.

At step S8, shared server 12 determines whether N is at least equal to M, where N is the number of objects known by object X, and where M is the maximum number of objects which object X is allowed to sense or recognize. If N is found to be smaller than M, the flow of the processing continues to step S10 where shared server 12 determines whether the ID of object A is included in the list Lknow of object X, and whether object A is located in the aura of object X. If the ID of object A is not included in the list Lknow of object X, but object A is located in the aura of object X, the flow of the processing continues to step S11 where the ID of object A is added to the list Lknow of object X. In this manner, since object X becomes aware of object A, N representing the number of objects recognized by object X is incremented by 1. In addition, the ID of object X is added to the list Lknown of object A. As a result, that object X recognizes object A is cataloged in the list Lknow of object X, and that object A is recognized by object X is cataloged in the list Lknown of object A.

On the other hand, if the outcome of the determination at step S10 indicates that the ID of object A has already been included in the list Lknow of object X such that object X is already aware of object A, or if object A is not located in the aura of object X such that it is not necessary for object X to know object A, the flow of the processing returns to step S1 to repeat the processing described above, bypassing the processing of step S11.

In the processing described above, however, a mismatching state as described below may exist. As described above, a mismatching state results when object A is already recognized by object X but object A is not aware of the object X. In order to avoid such a mismatching state, if the outcome of the determination at step S4 indicates that N (which is the number of objects known by object A) is at least equal to the maximum M, the flow of the processing continues to step S5 where shared server 12 determines whether the ID of object X is included in the list Lknown of object A. If the ID of object X is not included in the list Lknown of object A such that object A is not known by object X, it is also not necessary for object A to recognize object X as a new object because the number of objects recognized by object A has reached the maximum M. In this case, the flowchart proceeds to step S8 to carry out the processing thereof and the subsequent steps, bypassing the carious processes of steps S6 and S7.

If the outcome of the determination made at step S5 indicates that the ID of object X has already been included in the list Lknown of object A such that object A is already recognized by object X, a mismatching state will occur if object A is not aware of object X. In order to avoid such a mismatching state, a procedure to allow object A recognize object X is carried out even if the number of objects recognized by object A has reached the maximum M. In this case, the flow of the processing goes on to step S6, ignoring the upper limit imposed by the maximum M. If the predetermined conditions are found to be satisfied at step S6, the flow of the processing goes on to step S7 to carry out the processing to permit object A to recognize object X.

By the same token, if the determination at step S8 indicates that N which is the number of objects known by the object X is at least equal to the maximum M, the flow of the processing continues to step S9 where shared server 12 determines whether the ID of object A is included in the list Lknown of object X. If the ID of object A is included in the list Lknown of object X such that object X is already recognized by object A, the flow of the processing goes on to step S10, ignoring the upper limit imposed by the maximum M. If the predetermined conditions are found to be satisfied at step S10, the flow of the processing goes on to step S11 to carry out the processing to permit object X to recognize object A. As a result, the mismatching state can be avoided.

If the outcome of the determination at step S9 indicates that the ID of object A is not included in the list Lknown of object X such that object X is not recognized by object A, it is also not necessary for object A to recognize object X as a new object. In this case, the flow of the processing returns to step S1 without resulting in a mismatching state, bypassing the various processes of steps S10 and S11.

The processing represented by the flowchart shown in FIG. 11 can also be applied to a case where the radius of the aura varies from object to object. If all auras of objects have a uniform radius, the algorithm adopted by the flowchart shown in FIG. 11 can be simplified into a flowchart as shown in FIG. 12.

Figure 12:
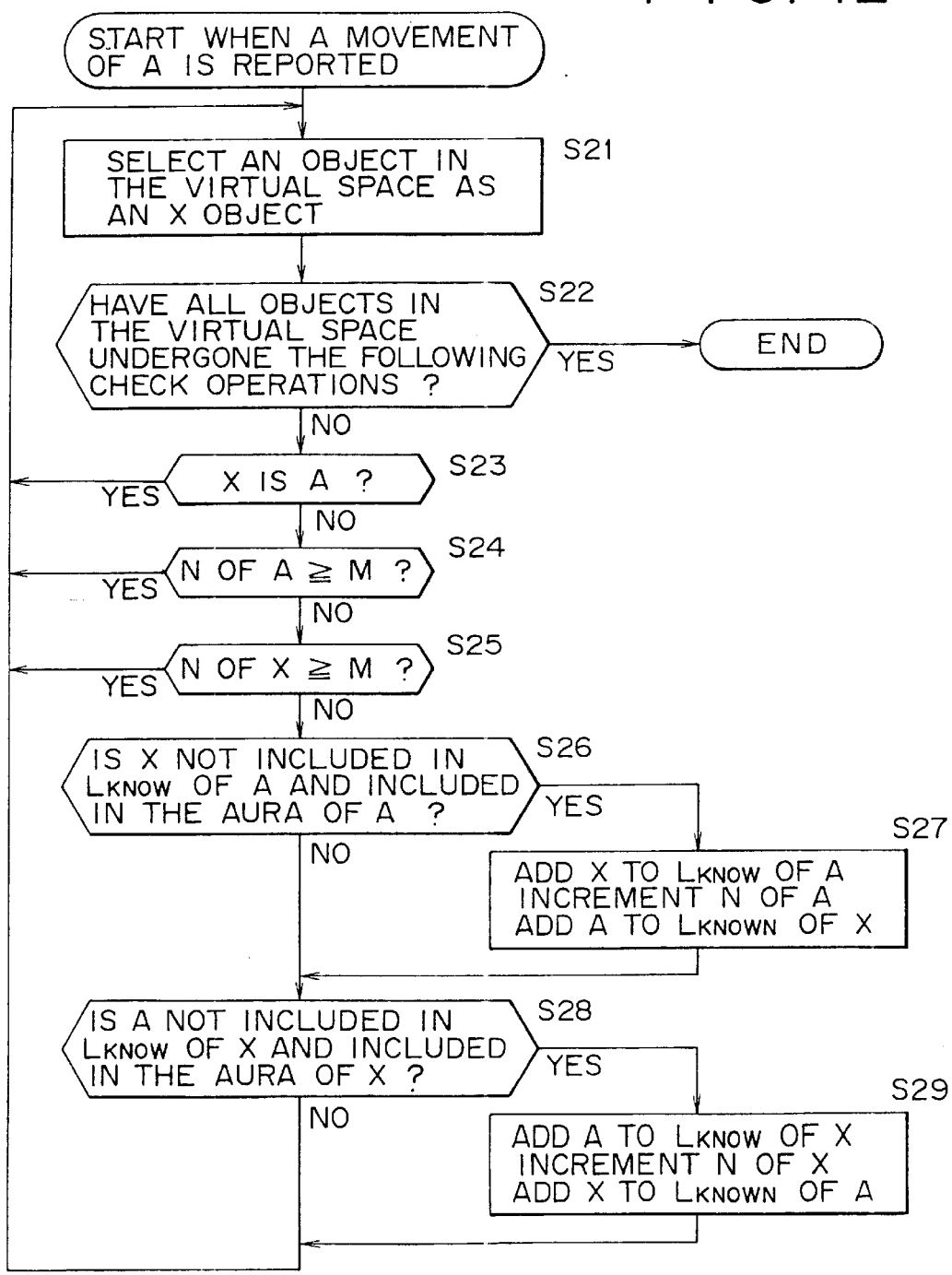
FIG. 12 shows a flowchart representing other operations carried out by the shared server employed in the system shown in FIG. 1.

As shown in FIG. 12, at step S21, shared server 12 selects an object among those existing in the 3-dimensional virtual space. The selected object is referred to hereafter as an object X. The flow of the processing then goes on to step S22 where shared server 12 determines whether all the objects existing in the virtual space have been subjected to the check operations at the subsequent steps. If all the objects existing in the virtual space have been subjected to the subsequent check operations, the processing is terminated. On the other hand, if any object existing in the virtual space has not been subjected to the subsequent check operations, the flow of the processing goes on to step S23. At step S23, shared server 12 determines whether object X selected at step S21 is an object A itself, that is, whether object X is an object representing the user. If selected object X is an object representing the user, the flow of the processing returns to step S21 to repeat the various processes of steps S21 to S23.

On the other hand, if the outcome of the determination at step S23 indicates that object X selected at step S21 is not an object representing the user, the flow of the processing proceeds to step S24 where shared server 12 determines whether N is at least equal to M, where N is the number of objects recognized by object A, and where M is the maximum number of objects that object A is allowed to sense as described above. If the outcome of the determination at step S24 indicates that N is at least equal to M, or, by the same token, if the outcome of a determination at step S25 indicates that N is at least equal to M, where N is the number of objects recognized by object X, whereas M is the maximum number of objects which object X is allowed to sense, the flow of the processing returns to step S21 to repeat the various processes of step S21 and the subsequent steps.

In this manner, in the processing represented by the flowchart shown in FIG. 12, if the number N of objects recognized by object A is at least equal to the maximum M even if the number N of objects recognized by object X is still smaller than the maximum M and, hence, object X would naturally be allowed to recognize another object including object A. Alternatively, if the number N of objects recognized by object X is at least equal to the maximum M even if the number N of objects recognized by object A is still smaller than the maximum M, and hence, object A would naturally be allowed to recognize another object including object X, object A is no longer allowed to recognize another object including object X, and likewise object X is also no longer allowed to recognize another object including object A.

On the contrary, in the processing represented by the flowchart shown in FIG. 11, when one object is still permitted to recognize the other object even if the number of objects recognized by the other object has already reached the maximum M, the object is made to newly recognize the other object, as distinguished from the processing as illustrated in FIG. 12. Accordingly, in the processing represented by the flowchart shown in FIG. 11, the mismatching state as described below can be avoided.

For example, consider a case where an object with an aura which has a large radius recognizes the existence of the other object having an aura with a small radius. The number of objects recognized by the other object with a small radius aura has reached its maximum. The two objects approach each other, and at the moment when the object with a large radius aura enters the small radius aura of the other object, the object with the large radius aura cannot recognize the other object with the small radius aura due to the fact that the number of objects known by the other object with a small radius aura has reached its maximum. Such mismatching state can be avoided in the processing represented by the flowchart shown in FIG. 11.

On the other hand, the processing represented by the flowchart shown in FIG. 12 is based on the assumption that all objects have auras with a uniform radius such that there is no a mismatching state where a specific object is capable of recognizing the other object but the other object is not capable of recognizing the specific object. For this reason, if the number N of objects recognized by any one of the two objects has reached the maximum M, both objects are no longer allowed to recognize any other objects.

Referring again to FIG. 12, if the outcome of the determination at step S24 indicates that the number N of objects recognized by object A is still less than the maximum M, and the outcome of the determination at step S25 indicates that the number N of objects recognized by object X is still less than the maximum M, the flow of the processing goes on to step S26 where shared server 12 determines whether the ID of object X is included in the list Lknow of object A, and whether object X is located in the aura of object A. If the ID of object X is not included in the list Lknow of object A such that object A is not aware of object X, but object X is located in the aura of object A, the flow of the processing continues to step S27 where the ID of object X is added to the list Lknow of object A. In this manner, since object A becomes aware of object X, N which represents the number of objects recognized by object A is incremented by 1. In addition, the ID of object A is added to the list Lknown of object X to indicate that object X is recognized by object A. As a result, that object A recognizes object X is cataloged in the list Lknow of object A, and that object X is recognized by object A is cataloged in the list Lknown of object X.

If the outcome of the determination at step S26 indicates that the ID of object X has already been included in the list Lknow of object A such that object A is already aware of object X, or if object X is not located in the aura of object A such that it is not necessary for object A to recognize object X, the flow of the processing continues to step S28, bypassing the processing of step S27.

At step S28, shared server 12 determines whether the ID of object A is included in the list Lknow of object X, and whether object A is located in the aura of object X. If the ID of object A is not included in the list Lknow of object X, but object A is located in the aura of object X, the flow of the processing continues to step S29 where the ID of object A is added to the list Lknow of object X. In this manner, since object X becomes aware of the object A, N which represents the number of objects recognized by object X is incremented by 1. In addition, the ID of object X is added to the list Lknown of object A. As a result, that object X recognizes object A is cataloged in the list Lknow of object X, and that object A is recognized by object X is cataloged in the list Lknown of object A.

If the outcome of the determination at step S28 indicates that the ID of object A is included in the list Lknow of object X such that object X is already aware of object A, or if object A is not located in the aura of object X such that it is not necessary for object X to recognize object A, the flow of the processing returns to step S21 to repeat the processing described above, bypassing step S29.

In the embodiment described above, it is assumed that all objects have auras with a predetermined uniform radius. An object only receives information from other objects located in the aura of the object. Moreover, it should be noted that one of the objects can be an application object which is normally shared by avatars participating in the world. Examples of such a shared application object are an electronic pet and a watch stand which are shared by avatars in the world. It is thus desirable to present information from such an application object to avatars with a high degree of reliability. To do so, shared server 12 controls information such as that illustrated in FIG. 13 for each object.

First information to fourth information shown in FIG. 13 are the same as the respective ones shown in FIG. 10. As shown in FIG. 13, the fifth information is an application-object AO flag indicating whether or not the object is an application object. To be more specific, an AO flag value of 1 indicates that the object is an application object. On the other hand, an AO flag value of 0 indicates that the object is not an application object. Applicable only to an application object, sixth information is an aura-func flag indicating whether or not the object is to be included in an object count to be compared with the maximum value M of another object, that is, the maximum number of objects that the other object is allowed to sense, when the object enters the aura of the other object. To be more specific, an aura-func flag of 0 indicates that the object is not to be included in an object count to be compared with the maximum value M of another object. On the other hand, an aura-func flag of 1 indicates that the object is to be included in an object count to be compared with the maximum value M of another object. That is to say, an aura-func flag of 1 indicates that the object is the same as an ordinary object.

Figure 14:
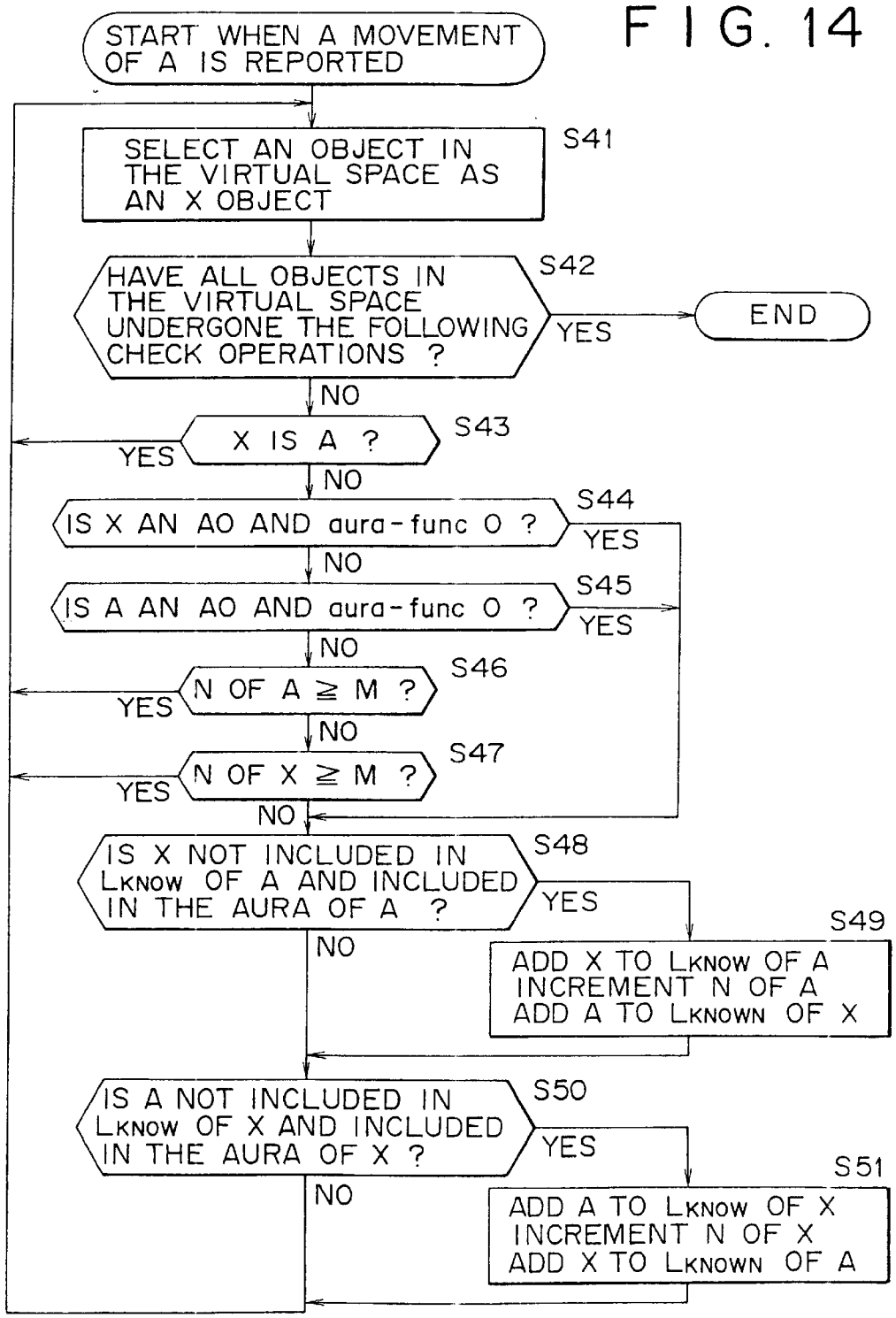
FIG. 14 shows a flowchart representing processing carried out by the shared server employed in the system shown in FIG. 1.

The following description explains the processes carried out by shared server 12 on the basis of the control information shown in FIG. 13 to accompany a movement of an object A with reference to a flowchart shown in FIG. 14. As shown in FIG. 14, the flowchart begins with processes at steps S41 to S43 which are the same as those at steps S21 to S23 of the flowchart shown in FIG. 12. In particular, at step S41, shared server 12 selects an object among those existing in the 3-dimensional virtual space (the world). The selected object is referred to hereafter as an object X. Then, at step S42, shared server 12 determines whether all the objects existing in the virtual space have been subjected to the check operations at the subsequent steps. If all the objects existing in the virtual space have been subjected to the subsequent check operations, the processing is terminated. On the other hand, if any object existing in the virtual space has not been subjected to the subsequent check operations, the flow of the processing goes on to step S43.

At step S43, shared server 12 determines whether object X selected at step S41 is an object A, that is, whether object X is an object representing the user. If the selected object X is an object representing the user, the flow of the processing returns to step S41 to repeat the various processes of steps S41 to S43. On the other hand, if the outcome of the determination at step S43 indicates that the selected object X is not an object representing the user, the flow of the processing goes on to step S44 where shared server 12 determines whether the object X selected at step S41 is an application object AO, and further, whether the value of the aura-func flag of the object X is 0 such that whether or not object X is an AO to be included in an object count to be compared with the maximum value M of object A is determined.

If object X selected at step S41 is not an application object AO, or if the value of the aura-func flag of the object X is 1, the flow of the processing goes on to step S45 where shared server 12 determines whether object A is an application object, and whether the value of the aura-func flag of object A is 0. If object A is not an application object AO, or if the value of the aura-func flag of object A is 1, the flow of the processing goes on to step S46 to carry out the processing thereof and the subsequent steps. The processes of steps S46 to S51 are the same as those of steps S24 to S29, respectively of the flowchart shown in FIG. 12. Much like the processing represented by the flowchart shown in FIG. 12, if the number N of objects recognized by any one of objects X and A has reached the maximum M, both objects X and A are no longer permitted to recognize each other.

If the outcome of the determination at step S44 indicates that object X is an AO, and that it is not included in an object count to be compared with the maximum value M, the flow of the processing goes on to the step S48, bypassing steps S46 and S47. By the same token, if the outcome of the determination made at step S45 indicates that object A is an AO, and that it is not included in an object count to be compared with the maximum value M, the flow of the processing goes on to step S48, bypassing steps S46 and S47. At step S48 and the subsequent steps, even if the number N of objects in the aura of object A or X has reached the maximum number M, processing to allow object A or X to recognize object X or A, respectively is carried out provided that the predetermined conditions are satisfied as indicated by a YES outcome of a determination made at step S48 or S50, respectively. As a result, an application object with an aura-func flag reset at 0 is allowed to sense all other objects existing in the aura of the application object. In addition, an object other than the application object with the aura-func flag reset at 0 is allowed to sense the application object with an aura-func flag reset at 0 regardless of the number of objects existing in the aura of the object when the application object with the aura-func flag reset at 0 is placed in the aura.

Figure 15:
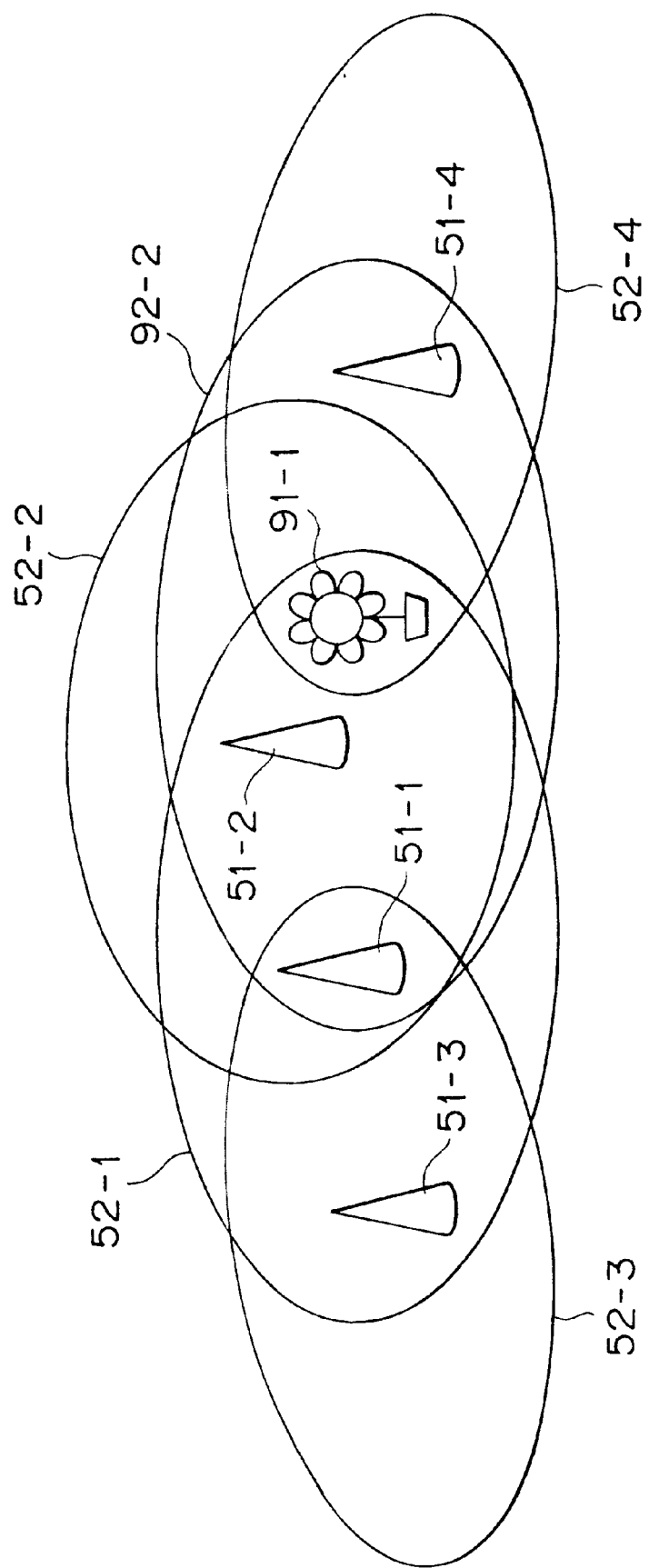
FIG. 15 is a diagram showing relations between objects and auras.

To put it concretely, consider a case shown in FIG. 15 as an example. In this example, avatars 51-2 and 51-3 are already in the aura 52-1 of an avatar 51-1. Then, avatar 51-1 moves to a new position so that an application object 91-1 with an aura-func flag set at 0 is included in aura 52-1. In this case, avatar 51-1 is allowed to sense the application object 91-1 even if the number of objects in aura 52-1 has already reached a maximum M of 2. In addition, the application object 91-1 is also allowed to sense avatar 51-1. In addition, the application object 91-1 is allowed to sense all other objects existing in aura 92-2 of the application object 91-1. Thus, in the example shown in FIG. 15, avatar 51-1, avatar 51-2, and avatar 51-4 are sensed by the application object 91-1. However, avatar 51-3 which is placed outside aura 92-2, is not sensed by application object 91-1.

The flowchart shown in FIG. 14 is virtually the same as the flowchart shown in FIG. 12 except that, in the case of the former, steps S44 and S45 are added. Thus, in the case where the object is not an application object or an application object with the aura-func flag is set at 1, the same processing as the flowchart shown in FIG. 12 is carried out.

In the control information shown in FIG. 13, the flag indicating whether the object is an application substantially has the same function as the aura-func flag. For this reason, one of them can be omitted from the control information.

Figure 16:
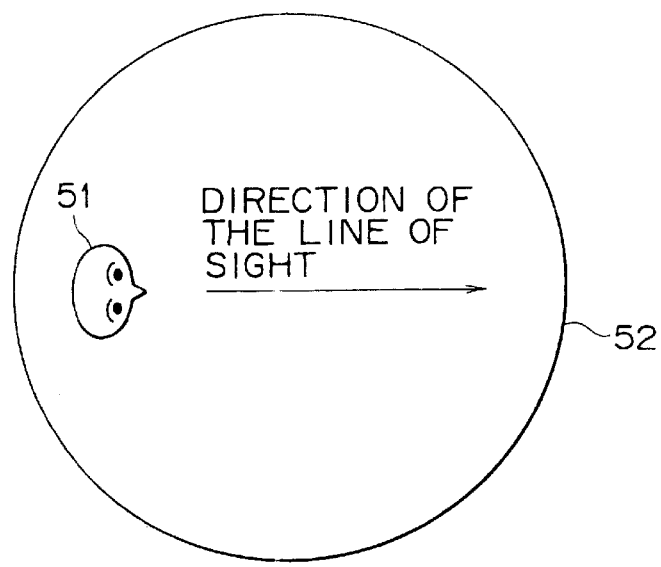
FIG. 16 is a diagram showing another example of an aura.
Figure 17:
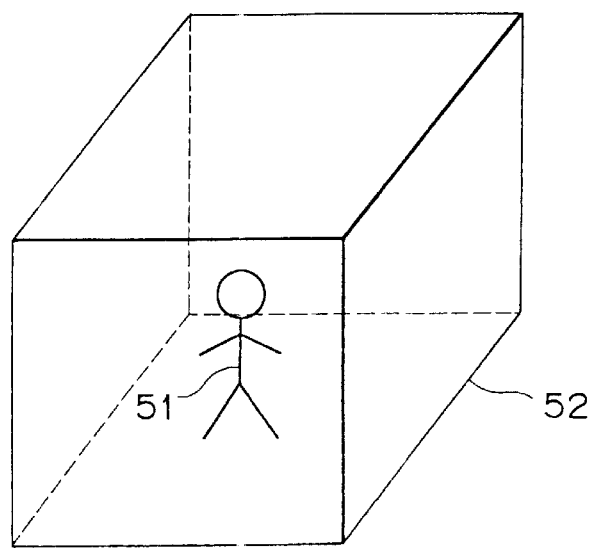
FIG. 17 is a diagram showing a further example of an aura.

It should be noted that the value of M representing the maximum number of objects that an object is allowed to sense can be changed dynamically as needed. In addition, an aura may be prescribed a range which increases in the direction of the line of sight. For example, as shown in FIG. 16, aura 52 is prescribed over a range which is wider in the direction of the line of sight of avatar 51 (the direction to the right in the figure) than the opposite direction (the direction to the left in the figure). By doing so, it is possible to perform the operation of the avatar as if it existed in reality. In addition, while in this embodiment an aura has a spherical shape, it should be noted that an aura can also have a cubical shape such as that shown in FIG. 17.

Furthermore, in accordance with the present invention, an aura is assigned or prescribed to an object. It is worth noting, however, that a plurality of objects (avatars) may also share an aura. In this manner, the avatars are capable of carrying out a sensing operation as a single avatar. Moreover, an aura may be prescribed a plurality of ranges for an object.

It should be noted that a computer program to be executed to carry out the various kinds of processing described above is presented to the user through presentation media which can be a network presentation media such as the Internet and a digital satellite or information recording media such as a CD-ROM, an optical disc and a magnetic disc, which can be used by recording onto an installed RAM or hard disc as needed.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An information processing apparatus for receiving information through a first object placed in a 3-dimensional virtual space from a second object, comprising:

prescription means for prescribing a range surrounding a first object and including a second object from which said information is received;

setting means for setting a restrictive condition for restricting a reception of information from said second object placed in said prescribed range;

judgment means for determining whether said first object is sensed by said second object; and control means for controlling said reception of information from said second object in accordance with said prescribed range and said restrictive condition.

2. The apparatus of claim 1 wherein said restrictive condition is a maximum number of other objects which may exist in said prescribed range and which said first object is allowed to sense.

3. The apparatus of claim 1 wherein said range prescribed by said prescription means has a 3-dimensional shape.

4. The apparatus of claim 3 wherein said 3-dimensional shape is a spherical shape.

5. The apparatus of claim 3 wherein said 3-dimensional shape is a cubic shape.

6. The apparatus of claim 1 wherein said first and second objects are first and second avatars.

7. The apparatus of claim 6 wherein said prescribed range is an aura surrounding said first avatar configured to maintain a substantially constant range around said first avatar.

8. The apparatus of claim 6 wherein said first and second avatars correspond to first and second users, respectively, in said 3-dimensional virtual space.

9. The apparatus of claim 1 wherein said control means forbids to receive information from said second object when said second object does not exist in said prescribed range.

10. The apparatus of claim 1 wherein the center of said prescribed range is at said first object.

11. The apparatus of claim 1 wherein said control means allows to receive information from said second object when said first object is sensed by said second object.

12. The apparatus of claim 11 wherein said control means allows to receive information from said second object even when said restricted condition is satisfied.

13. The apparatus of claim 11 wherein said control means allows to receive information from said second object even when said second object does not exist in said prescribed range.

14. The apparatus of claim 1 wherein said control means forbids to receive information from said second object when said first object is not sensed by said second object.

15. The apparatus of claim 14 wherein said control means forbids to receive information from said second object even when said restricted condition is not satisfied.

16. The apparatus of claim 14 wherein said control means forbids to receive information from said second object even when said second object exist in said prescribed range.

17. The apparatus of claim 1 wherein said judgment means determines that said first object is sensed by said second object when said first object exists in the second prescribed range surrounding said second object.

18. The apparatus of claim 1 wherein said judgment means determines that said first object is sensed by said second object when the second restrictive condition for restricting a reception of information from said first object is not satisfied.

19. The apparatus of claim 1 wherein said judgment means determines whether said restrictive condition is applicable to said second object.

20. The apparatus of claim 1 wherein said prescribed range is shared among a plurality of other objects.

21. An information processing method for receiving information through a first object placed in a 3-dimensional virtual space from a second object, said method comprising the steps of:
- a prescription step of prescribing a range surrounding said first object and including said second object from which information is received;
- a setting step of setting a restrictive condition restricting a reception of information from said second object placed in said prescribed range; and
- judgment means for determining whether said first object is sensed by said second object; and
- a control step of controlling a reception of information from said second object in accordance with said prescribed range and said restrictive condition.

22. The method of claim 21 wherein said restrictive condition is a maximum number of other objects which may exist in said prescribed range and which said first object is allowed to sense.

23. The method of claim 21 wherein said range prescribed by said prescription step has a 3-dimensional shape.

24. The method of claim 23 wherein said 3-dimensional shape is a spherical shape.

25. The method of claim 23 wherein said 3-dimensional shape is a cubic shape.

26. The method of claim 21 wherein said first and second objects are first and second avatars.

27. The method of claim 26 wherein said prescribed range is an aura surrounding said first avatar configured to maintain a substantially constant range around said first avatar.

28. The method of claim 26 wherein said first and second avatars correspond to first and second users, respectively, in said 3-dimensional virtual space.

29. The method of claim 21 wherein the center of said prescribed range is at said first object.

30. The method of claim 21 wherein said control step includes receiving information from said second object when said first object is sensed by said second object.

31. The method of claim 30 wherein said control step includes receiving information from said second object even when said restricted condition is satisfied.

32. The method of claim 30 wherein said control step includes receiving information from said second object even when said second object does not exist in said prescribed range.

33. The method of claim 21 wherein said control step forbids the reception of information from said second object when said first object is not sensed by said second object.

34. The method of claim 33 wherein said control step forbids the reception of information from said second object even when said restricted condition is not satisfied.

35. The method of claim 33 wherein said control step forbids the reception of information from said second object even when said second object exist in said prescribed range.

36. The method of claim 21 wherein said judgment step determines that said first object is sensed by said second object when said first object exists in the second prescribed range surrounding said second object.

37. The method of claim 21 wherein said judgment step determines that said first object is sensed by said second object when the second restrictive condition for restricting a reception of information from said first object is not satisfied.

38. The method of claim 21 wherein said judgment step determines whether said restrictive condition is applicable to said second object.

39. The method of claim 21 wherein said prescribed range is shared among a plurality of other objects.

40. A presentation medium for presenting a program executable by a computer to drive an information processing apparatus for receiving information through a first object placed in a 3-dimensional virtual space from a second object to carry out processing including:
- a prescription step of prescribing a range surrounding said first object and including said second object from which information is received;
- a setting step of setting a restrictive condition restricting a reception of information from said second object placed in said prescribed range; and
- judgment means for determining whether said first object is sensed by said second object; and
- a control step of controlling said reception of information from said second object in accordance with said prescribed range and said restrictive condition.

41. The presentation medium of claim 40 wherein the center of said prescribed range is at said first object.

42. The presentation medium of claim 40 wherein said control step includes receiving information from said second object when said first object is sensed by said second object.

43. The presentation medium of claim 42 wherein said control step includes receiving information from said second object even when said restricted condition is satisfied.

44. The presentation medium of claim 42 wherein said control step includes receiving information from said second object even when said second object does not exist in said prescribed range.

45. The presentation medium of claim 40 wherein said control step forbids the reception of information from said second object when said first object is not sensed by said second object.

46. The presentation medium of claim 45 wherein said control step forbids the reception of information from said second object even when said restricted condition is not satisfied.

47. The presentation medium of claim 45 wherein said control step forbids the reception of information from said second object even when said second object exist in said prescribed range.

48. The presentation medium of claim 40 wherein said judgment step determines that said first object is sensed by said second object when said first object exists in the second prescribed range surrounding said second object.

49. The presentation medium of claim 40 wherein said judgment step determines that said first object is sensed by said second object when the second restrictive condition for restricting a reception of information from said first object is not satisfied.

50. The presentation medium of claim 40 wherein said judgment step determines whether said restrictive condition is applicable to said second object.

51. The presentation medium of claim 40 wherein said prescribed range is shared among a plurality of other objects.

52. An information processing apparatus for receiving information through a first object placed in a 3-dimensional virtual space from a second object, comprising:
- a browser for executing a script program to process a VRML file including a prescribed range surrounding a first object and including a second object from which information is received; and
- a server for establishing a restrictive condition for restricting a reception of information from said second object placed in said prescribed range;
- judgment means for determining whether said first object is sensed by said second object; and wherein said server is configured to control said reception of information from said second object in accordance with said prescribed range and said restrictive condition.

53. The apparatus of claim 52 wherein said restrictive condition is a maximum number of other objects which may exist in said prescribed range and which said first object is allowed to sense.

54. The apparatus of claim 52 wherein said range prescribed by said prescription means has a 3-dimensional shape.

55. The apparatus of claim 54 wherein said 3-dimensional shape is a spherical shape.

56. The apparatus of claim 54 wherein said 3-dimensional shape is a cubic shape.

57. The apparatus of claim 52 wherein said first and second objects are first and second avatars.

58. The apparatus of claim 57 wherein said prescribed range is an aura surrounding said first avatar configured to maintain a substantially constant range around said first avatar.

59. The apparatus of claim 57 wherein said first and second avatars correspond to first and second users, respectively, in said 3-dimensional virtual space.

60. An information processing system for a 3-dimensional virtual shared space, comprising:
   a user terminal having a browser loaded therein to execute a script program stored in a storage medium for processing a VRML file, said VRML file including a first aura having a prescribed range surrounding a first avatar and including a second avatar from which information is received; and
   a shared server coupled to said user terminal for establishing a restrictive condition to restrict a reception of information from said second avatar placed in said aura;
   judgment means for determining whether said first object is sensed by said second object; and
   wherein said shared server is configured to control said reception of information from said second avatar in accordance with said prescribed range of said first aura and said restrictive condition.

61. The apparatus of claim 60 wherein said virtual shared space is a multi-user environment.

62. The apparatus of claim 60 wherein said virtual shared space is a single-user environment.

63. The apparatus of claim 60 further including a second aura having a prescribed range surrounding said second avatar.

64. The apparatus of claim 60 wherein said first and second avatars share said first aura such that said first and second avatars are configured to detect other avatars as a single avatar.

65. The apparatus of claim 60 wherein said first aura is prescribed a plurality of ranges.

66. The apparatus of claim 65 wherein said plurality of ranges are configured such that one of said ranges in a direction of the line of sight for said first avatar is greater than one of said ranges in a direction perpendicular to the direction of the line of the sight for said first avatar.

67. The apparatus of claim 65 wherein said plurality of ranges are configured to be substantially constant with respect to the position of said first avatar when said first avatar is configured to move in said virtual shared space.

68. The apparatus of claim 60 wherein said prescribed range for said first aura has a substantially constant radius surrounding said first avatar.

69. The apparatus of claim 60 wherein said user terminal includes a display unit for displaying said 3-dimensional virtual shared space.

70. The apparatus of claim 69 wherein said display unit is one of a cathode ray display unit, a LCD display unit, or a plasma display unit.

71. The apparatus of claim 60 wherein said user terminal includes an input unit for operatively controlling the movement of said first avatar.

72. The apparatus of claim 71 wherein said input unit is one of a computer mouse, a keyboard, a touchpad, or a microphone.

73. The apparatus of claim 60 wherein said user terminal further includes an output unit for outputting sound signals corresponding to the virtual shared space.

74. The apparatus of claim 73 wherein said output unit is a speaker.

75. The apparatus of claim 73 wherein said user terminal further includes a sound processing circuit for processing sound information received from the shared server, said sound information dynamically corresponding to the virtual shared space.

76. The apparatus of claim 60 wherein said browser is a Community Place Browser.

77. The apparatus of claim 60 wherein said restrictive condition is a maximum number of other avatars which may exist in said prescribed aura and which said first avatar can detect.

78. The apparatus of claim 77 wherein said maximum number is either 5 or 10.

79. The apparatus of claim 60 wherein said shared server is further configured to determine whether said first avatar is detected by said second avatar, and to control said reception of information from said second avatar in accordance with an outcome of said determination.

80. The apparatus of claim 60 wherein, if the number of avatars existing in said aura of at least either said first avatar or said second avatar has satisfied said restrictive condition, said first avatar and said second avatar are configured to not detect each other.

81. The apparatus of claim 60 wherein, even when said restrictive condition is satisfied, said first avatar and said second avatar are configured to detect each other when a predetermined condition is satisfied.

82. The apparatus of claim 81 wherein said predetermined condition is satisfied when said second avatar detects said first avatar in said prescribed aura.

83. The apparatus of claim 60 wherein said shared server is further configured to determine whether said restrictive condition is applicable to said second avatar, and to control said reception of information from said second avatar in accordance with an outcome of said determination.

84. The apparatus of claim 60 wherein said range of said aura has a 3-dimensional shape.

85. The apparatus of claim 84 wherein said 3-dimensional shape is a spherical shape.

86. The apparatus of claim 84 wherein said 3-dimensional shape is a cubic shape.

87. The apparatus of claim 60 wherein said first and second avatars correspond to first and second users, respectively, in said 3-dimensional virtual space.

* * * * *